United States Patent [19]
Phillips

[11] Patent Number: 4,864,139
[45] Date of Patent: Sep. 5, 1989

[54] RADIATION DETECTOR AND MONITOR

[76] Inventor: Burton K. Phillips, Rte. 1, Box 1970, Tetonia, Id. 83452

[21] Appl. No.: 128,414

[22] Filed: Dec. 3, 1987

[51] Int. Cl.⁴ .............................................. G01T 1/202
[52] U.S. Cl. ................................... 250/367; 250/368; 250/369; 250/485.1; 250/486.1
[58] Field of Search ............... 250/367, 366, 368, 369, 250/361 R, 485.1, 486.1, 487.1, 488.1

[56] References Cited
U.S. PATENT DOCUMENTS

| | | | |
|---|---|---|---|
| 4,092,539 | 5/1978 | Pao et al. ............................ | 250/364 |
| 4,336,532 | 6/1982 | Biehl et al. ........................... | 250/388 |
| 4,480,311 | 10/1984 | Mastain et al. ...................... | 250/388 |
| 4,489,315 | 12/1984 | Falk et al. ............................ | 250/392 |
| 4,629,894 | 12/1986 | Lelong ............................. | 250/363 R |

Primary Examiner—Janice A. Howell
Assistant Examiner—William F. Rauchholz
Attorney, Agent, or Firm—Fleit, Jacobson, Cohn & Price

[57] ABSTRACT

Radiation level is visually registered through a viewing window by a color coded array of different colored dots of light resulting from scintillations concentrated by optical means at spaced focal points. The scintillations are emitted from radiation detecting elements spaced along a radiation receiving chamber enclosed within a housing on which the viewing window is mounted adjacent an electronic scintillation sensor.

29 Claims, 2 Drawing Sheets

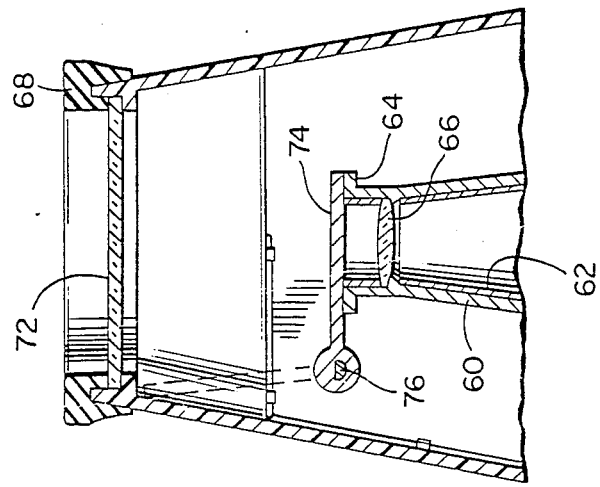
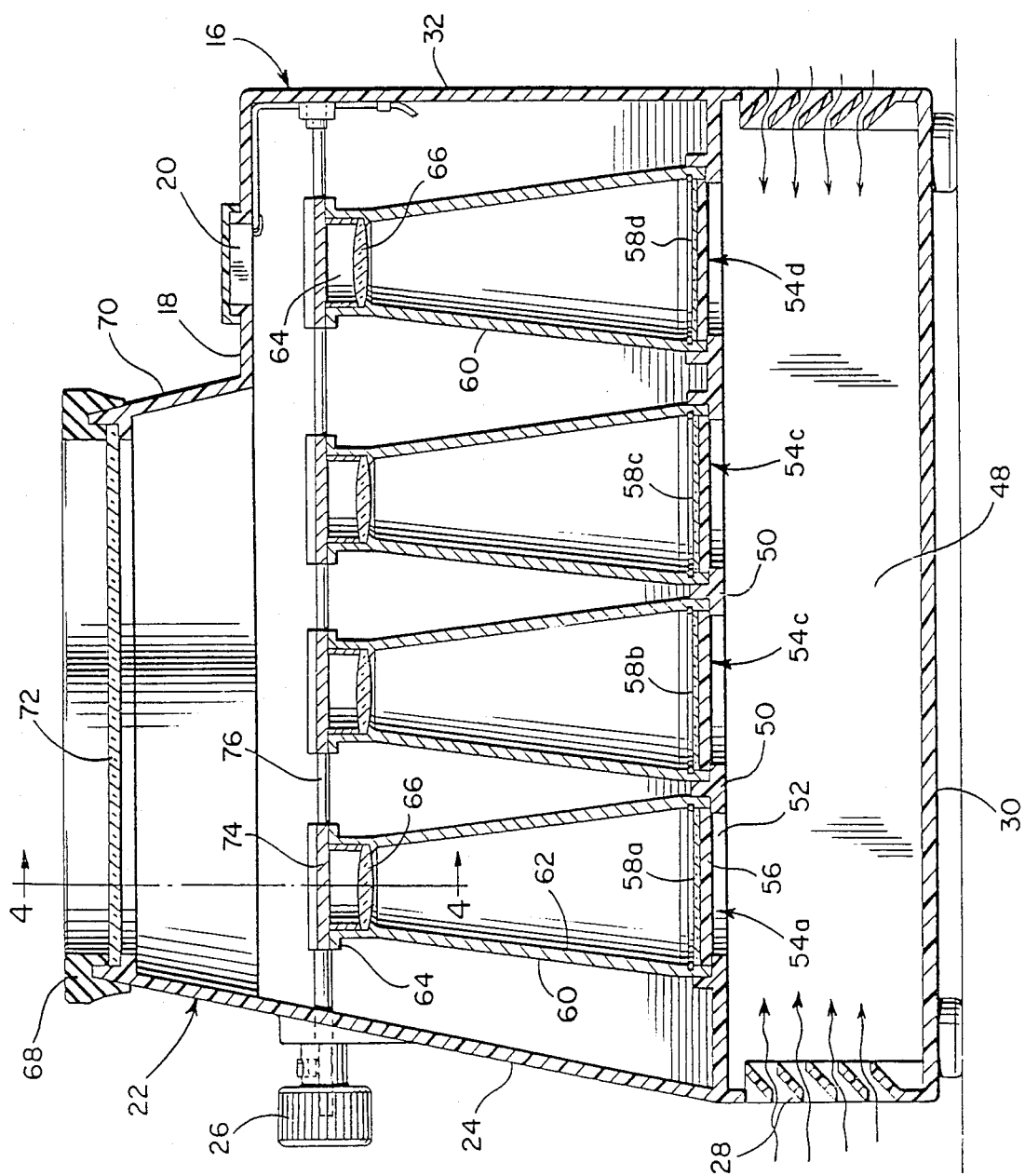

RADIATION DETECTOR AND MONITOR

BACKGROUND OF THE INVENTION

FIELD OF THE INVENTION

This invention relates generally to the detection, measuring and monitoring of radiation from a radioactive source.

Radiation detecting devices utilizing scintillator detectors optically coupled to an electronic sensing device through which photon scintillations emitted from the detector scintillate is converted into electrical pulses, are already well known as disclosed for example in U.S. Pat. Nos. 4,092,539 to Pao et al. and 4,629,894 to Lelong. Such prior radiation monitoring devices are usually associated with electrical signal processing systems through which information is provided to the user. Radiation sensing monitors which feature electrical signal processing means providing alerting or alarm outputs, are also disclosed by way of example in U.S. Patent Nos. 4,336,532, 4,489,315 and 4,480,311 to Biehl, Falk and Mastain, respectively.

Such prior radiation monitoring devices have been relatively expensive and required a substantial amount of training on the part of the user to operate. Further, malfunction of any portion of the signal processing system associated with the aforementioned radiation monitoring equipment would produce either erroneous or misleading readouts and a considerable delay before correct radiation readout indications could be made available.

It is therefore an important object of the present invention to provide a radiation monitoring device that is more practical for use by the general public and less costly as compared to prior art monitoring devices of a similar type.

A further object in accordance with the preceding object is to provide a low cost radiation monitoring device providing radiation level readout that is capable of being confirmed or correctness and more readily understandable by the general public.

SUMMARY OF THE INVENTION

In accordance with the present invention, radiation of a relatively high energy level, such as gamma and beta radiation, penetrates a plastic envelope housing to impinge upon a plurality of spaced scintillate detectors from which photon scintillations are emitted at closely spaced locations. Scintillations of different color respectively emitted from the spaced radiation detecting elements are optically concentrated at focal points aligned with a viewing window. Radiation level is thereby visually read out through the viewing window in accordance with a color code under selective control of a manually operable shutter mechanism. The radiation monitoring device also encloses an additional scintillate type of radiation detecting element from which scintillations are emitted and concentrated onto an electronic sensor through which the scintillations are converted into electrical pulses for readout through signal processing means. The electronic readout of the radiation detected may thereby be compared with the color coded visual readout aforementioned.

To provide increased sensitivity for detection of lower energy level radiation, the housing of the radiation monitoring unit is vented so that a stream of air carrying the radiation therein may provide more direct exposure of the scintillate detectors to the radiation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

FIG. 3 is a side section view of the radiation monitoring device shown in FIG. 1, taken substantially through a plane indicated by section line 3—3 in FIG. 1.

FIG. 4 is an enlarged partial section view taken substantially through a plane indicated by section line 4—4 in FIG. 3.

DETAILED DESCRIPTION OF THE PREFERRED EMBODIMENT

Figure 1:
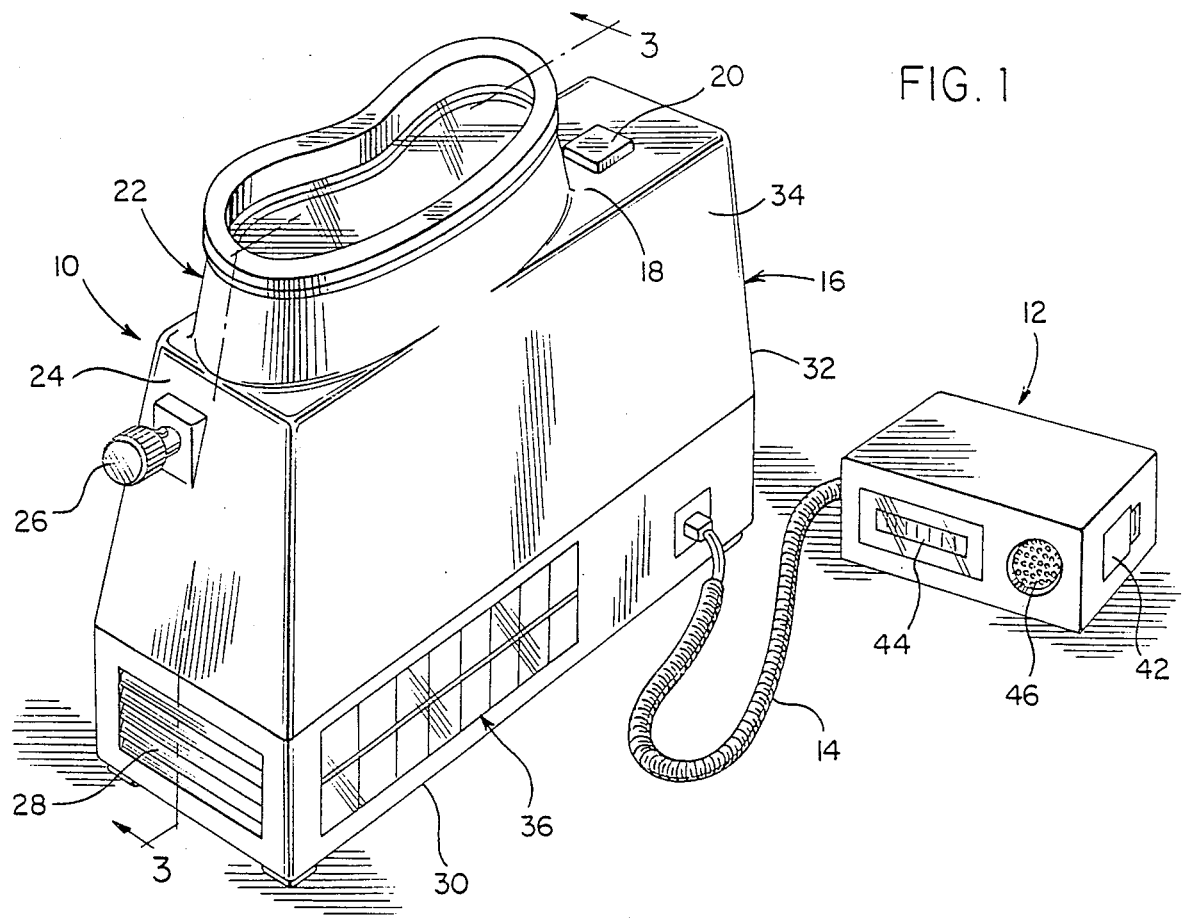
FIG. 1 is a perspective view showing radiation monitoring equipment in accordance with one embodiment of the present invention.

Referring now to the drawings in detail, FIG. 1 illustrates a radiation monitoring unit generally referred to by reference numeral 10, in accordance with one embodiment of the invention. An electronic signal processing and readout unit generally referred to by reference numeral 12 is operatively connected to the radiation monitoring unit 10 through a signal cable 14. The units 10 and 12 are operatively interconnected by the signal cable 14 as schematically depicted in FIG. 2.

The radiation monitoring unit 10 includes a housing generally referred to by reference numeral 16 having a top wall 18 on which an electronic sensing device 20, such as a photodetector, is mounted. Also mounted on the top wall 18 adjacent to the electronic sensor 20 and projecting upwardly therefrom is an eye-piece window viewing device generally referred to by reference numeral 22. On an end wall 24 of the housing closer to the viewing window device 22, a shutter control knob 26 is mounted to selectively render the viewing device 22 operative and inoperative for viewing purposes as hereinafter described in detail. An air ventilator 28 is mounted by the end wall 24 at its lower end adjacent to the bottom wall 30 of the housing. A similar ventilator is mounted at the opposite end wall 32 of the housing. The end walls are interconnected by the bottom wall 30 and spaced side walls 34 of the housing. A photoelectric array 36 through which solar energy is received, is mounted on the side wall 34 from which the cable 14 extends.

Figure 2:
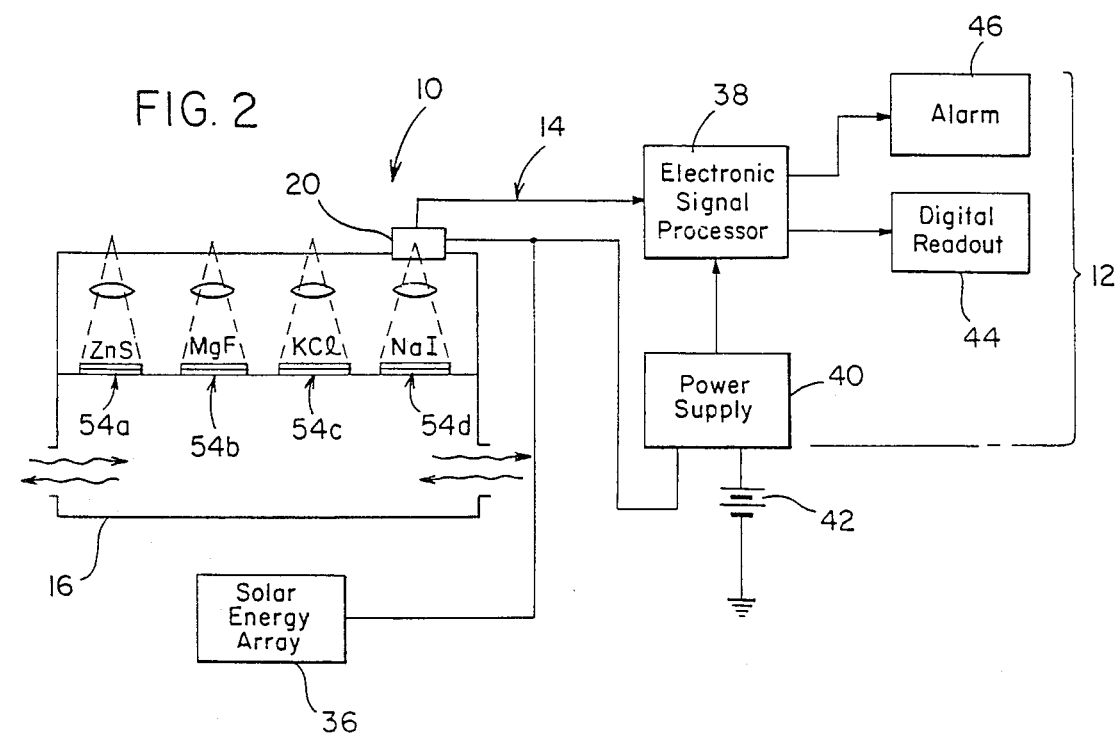
FIG. 2 is a schematic and block diagram depicting the radiation monitoring system associated with the equipment illustrated in FIG. 1.

As schematically depicted in FIG. 2, the unit 12 includes an electronic signal processor 38 receiving a signal input from the electronic sensor 20 and powered through a power supply 40 to which a voltage source is connected in the form of a battery 42 rechargeable by means of the solar energy array 36 to which the power supply 40 is electrically connected as shown. A digital readout device 44 is connected to the signal processor 38 as well as an audible alarm device 46.

Referring now to FIG. 3 in particular, the housing 16 encloses an air flow chamber 48 which extends between the ventilators 28 at the lower ends of the end walls 24 and 32 along the bottom wall 30. A divider wall 50 within the housing separates the chamber 48 from the rest of the housing interior. Four longitudinally spaced openings 52 are formed in the divider wall 50 for exposure of the chamber 48 to a plurality of scintillate types of radiation detectors 54A, 54B, 54C and 54D. Each radiation detector is formed by a substrate Mylar film 56 on which a scintillate coating 58A, 58B, 58C or 58D is deposited.

In accordance with the present invention, different scintillate coatings or phosphors are selected for the respective radiation detectors in order to provide a range of calibrated, color coded radiation level sensitivities. Further, stable compounds are selected for the scintillate coatings so as not to rapidly deteriorate when subject to light. For. example, the first scintillate coating 58A is zinc sulfide (1nS) to begin glow in response to the presence of 50 millirems of radiation. The scintillate emission from coating 58A will furthermore provide a blue green light. The second scintillate detector 54B will begin emission in response to 150 millirems of radiation and toward that end magnesium fluoride (MgF) would be utilized for the coating 58B in order to provide orange color light. The third scintillate coating 58C will be potassium chloride (KCl) arranged to provide a magenta or red light indication in response to exposure to 250 millirems of radiation. The fourth scintillate coating 58D will be a crystal such as sodium iodine (NaI), arranged to be more sensitive than the other scintillate coatings from which emissions are detected by the electronic sensor or photodetector 20 aforementioned.

With continued reference to FIG. 3, the scintillations emitted from the respective radiation detector coatings, are concentrated by means of conical envelopes 60 made of an opaque material and having an internally reflective surface 62. The conical members 60 extend from their large diameter ends within which the radiation detectors 54 are mounted, to small diameter end portions 64 within which focusing lenses 66 are mounted. Accordingly, the scintillations respectively emitted from the radiation detectors 54A, 54B and 54C will appear at spaced focal points as different colored dots of light visible to a viewer through the viewing window device 22. The scintillations emitted from the radiation detector 54D, on the other hand, will be concentrated at a focal point on the electronic photodetector 20 through which the scintillations are converted into electrical signals applied to the signal processor 38 from which a digital readout is obtained through device 44 as well as an alarm in response to excessive radiation through the alarm device 46 in a manner generally well known in the art.

By increasing the areas of scintilate material with a corresponding change in optics for magnification or light amplification, a more sensitive radiation monitoring unit may be achieved, with different reading ranges and a radiation level reading of less than the minimum 50 millirem level hereinbefore given by way of example.

The electronic signal processor 38 will enable detection of only changes in light levels due to the averaging of light producing events caused by the radiation detecting activity of detector 54D and the concentration, magnification and amplification of the light reflected from the relatively large reflective area of the cone 60 to the small area of lens concentration.

In regard to the levels of radiation detected through the radiation detectors 54A, 54B and 54C, the different colored scintillations concentrated at focal points provide a color coded radiation level indication to the viewer through the viewing device 22. The viewing device is therefore provided with a soft sealing rim 68, made of Neoprene for example, at the upper end of a conical projection 70 from the top wall 18 of the housing. A viewing lens 72 is mounted at the upper end of the conical formation 70. The seal 68 is configured to comfortably fit against the head of a viewer while viewing the concentrated dots of light emitted from the scintillate coatings to block entry of external light into the housing 16. The housing 16 is made of an opaque plastic material so as to also prevent external light from causing erroneous indications. In order to selectively prevent entry of light through the viewing device 22 while in disuse, the upper end portions of the light concentrating conical members 60 are closed by means of shutter gate elements 74 as shown in FIGS. 3 and 4. The shutter elements are pivotally supported within the housing by a pivot shaft 76 connected to the shutter control knob 26 aforementioned. The shutter elements 74 are accordingly displaced by the user through the control knob 26 between the light blocking positions shown by solid line in FIG. 4 to the open, dotted line positions in order to enable visual monitoring by a viewer. Additionally, a protective cover may be placed over the neoprene seal 68 of the viewer device 22 for protection against atmospheric precipitation such as rain and snow.

From the foregoing description, the operation and use of the radiation monitoring equipment of the present invention will become apparent. As is already well known, the scintillate radiation detectors 54 hereinbefore described will emit photons of light when struck by certain kinds of radiation at different levels. In order to render the emitted scintillations readily visible to the human eye, the light concentrating conical envelopes 60 are provided with an interior reflective coating 62 and a focusing lens 66 to produce dots of light at focal points in complete darkness within clear view of the user through the viewing window device 22. Color coded visual indications of radiation level is thereby provided in addition to electronic readout provided by the photodetector 20.

In order to provide for broader and more sensitive detection of radiation, the radiation detectors are exposed to radiation through vented chamber 48 within the unit housing 16 through which gases with suspended radiation particles therein are exposed to the scintillate coatings through the Mylar films 56 blocking out light without shielding the detectors from the softer radiation that might otherwise be shielded by the housing and conical envelopes 60.

The signal processor 38 may be provided with a memory to store data on accumulated radiation received over an extended period of time. The unit may thereby have a dosimeter function to provide information regarding the amount of radiation accumulated over a given length of time in the event of a nuclear accident.

For proper monitoring operation, the unit 10 should be placed outside of buildings with a signal cable 14 of sufficient length to enable placement of the unit 12 at a convenient location indoors. The units 10 and 12 of the radiation monitoring equipment are powered by the photoelectric cell array 36 and battery 42 so as to avoid reliance on some external source of energy.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In apparatus for detecting and measuring radiation, which includes scintillator means for emitting photon scintillations in response to said radiation impinging thereon, an electronic sensor and optical means coupling the scintillator means to the sensor for conversion of the scintillations into electrical pulses to register detection of said impinging radiation, said optical means including a plurality of individual photon concentrating devices mounted in operative relation to the scintillator means for focusing and magnifying said scintillations at a plurality of corresponding focal points spaced from each other, one of the focal points being operatively aligned with the sensor and means coupled to the optical means for selectively viewing the scintillations focused at the other of the focal points.

2. The apparatus as defined in claim 1 wherein the scintillator means includes a plurality of radiation detecting elements from which said scintillations are emitted.

3. The apparatus as defined in claim 2 wherein each of said radiation detecting elements includes a substrate film and a scintillate coating thereon.

4. The apparatus as defined in claim 3 wherein the respective radiation detecting elements emit the scintillations from the scintillate coatings thereof in response to detection of different levels of radiation.

5. The apparatus as defined in claim 4 wherein the scintillations emitted from the respective scintillate coatings are of different color.

6. The apparatus as defined in claim 5 wherein each of said photon concentrating devices comprises an internally reflective conical envelope having a large diameter end mounted on one of the radiation detecting elements and a small diameter end from which the scintillations emerge and a focusing lens mounted in the conical envelope adjacent said small diameter end thereof establishing said focal points.

7. The apparatus as defined in claim 6 wherein said viewing means includes a window mounted in operative alignment with the other of the focal points and shutter control means for selectively blocking the focusing lens establishing said other of the focal points.

8. The apparatus as defined in claim 2 wherein each of said photon concentrating devices comprises an internally reflective conical envelope having a large diameter end mounted on one of the radiation detecting elements and a small diameter end from which the scintillations emerge and a focusing lens mounted in the conical envelope adjacent said small diameter end thereof establishing said focal points.

9. The apparatus as defined in claim 8 wherein said viewing means includes a window mounted in operative alignment with the other of the focal points and shutter control means for selectively blocking the focusing lens establishing said other of the focal points.

10. In apparatus for detecting and measuring radiation, which includes scintillator means for emitting photon scintillations in response to said radiation impinging thereon, optical means for focusing said scintilaltions at a plurality of spaced focal points comprising a plurality of photon concentrating devices respectively corresponding to said spaced focal points and mounted in operative relation to the scintillator means, and means for selectively viewing the scintillations focused at said focal points.

11. In apparatus for detecting and measuring radiation, which includes scintillator means for emitting photon scintillations in response to said radiation impinging thereon, optical means for focusing said scintillations at a plurality of spaced focal points comprising a plurality of photon concentrating devices respectively corresponding to said spaced focal points and mounted in operative relation to the scintillator means, and means for selectively viewing the scintillations focused at said focal points, the scintillator means including a plurality of radiation detecting elements respectively corresponding to said spaced focal points from which said scintillations are emitted.

12. The apparatus as defined in claim 11 wherein each of said radiation detecting elements includes a substrate film and a scintillate coating thereon.

13. The apparatus as defined in claim 12 wherein the respective radiation detecting elements emit the scintillations from the scintillate coatings thereof in response to detection of different levels of radiation.

14. The apparatus as defined in claim 13 wherein the scintillations emitted from the respective scintillate coatings are of different color.

15. The apparatus as defined in claim 11 wherein each of said photon concentrating devices comprises an internally reflective conical envelope having a large diameter end mounted on one of the radiation detecting elements and a small diameter end from which the scintillations emerge and a focusing lens mounted in the conical envelope adjacent said small diameter end thereof establishing said focal points.

16. The apparatus as defined in claim 15 wherein each of said radiation detecting elements includes a substrate film and a scintillate coating thereon.

17. The apparatus as defined in claim 16 wherein the respective radiation detecting elements emit the scintillations from the scintillate coatings thereof in response to detection of different levels of radiation.

18. The apparatus as defined in claim 16 wherein the scintillations emitted from the respective scintillate coatings are of different color.

19. In apparatus for detecting and measuring radiation, which includes scintillator means for emitting photon scintillations in response to said radiation impinging thereon, an electronic sensor and optical means coupling the scintillator means to the sensor for conversion of the scintillations into electrical pulses to register detection of said impinging radiation, said scintillator means including a plurality of radiation detecting elements, the respective radiation detecting elements having scintillate coatings from which the scintillations of different color are emitted in response to detection of respectively different levels of the impinging radiation and means coupled to the scintillator means for selectively viewing said scintillations to determine the radiation levels by color coding.

20. The apparatus as defined in claim 19 including a plurality of photon concentrating devices through which the scintillator means is coupled optically to the selective viewing means.

21. The apparatus as defined in claim 20 including a housing enclosing the scintillator means, the photon concentrating devices and a gas flow chamber through which the radiation detecting elements are exposed to said radiation.

22. The apparatus as defined in claim 21 wherein said selective viewing means includes an eye-piece window mounted on the housing in operative alignment with the photon concentrating devices and shutter means for selectively blocking the photon concentrating devices from exposure to external light through the eye-piece window.

23. Apparatus for detecting and measuring radiation, including a housing enclosing a gas flow chamber within which the radiation is received, a plurality of radiation detecting elements mounted in the housing in operative relation to the gas flow chamber, a viewing window mounted on the housing in operative alignment with said radiation detecting elements and optical means coupled to the radiation detecting elements for color coded visual registration of radiation level through the viewing window.

24. The apparatus as defined in claim 23 including electronic sensing means mounted on the housing for additional detection of the radiation received in the gas flow chamber.

25. The apparatus as defined in claim 23 wherein each of said radiation detecting elements includes a substrate film and a scintillate coating thereon from which photon scintillations are emitted, the scintillations emitted from the respective scintillate coatings of the radiation detecting elements corresponding to different levels of radiation detected.

26. The apparatus as defined in claim 25 wherein the optical means includes a plurality of photon concentrating devices respectively coupling the radiation detecting elements to the viewing window, each of said photon concentrating devices including an internally reflective conical member having a large diameter end mounted on one of the radiation detecting elements and a small diameter end from which the scintillations emerge and a focusing lens mounted in the conical member adjacent said small diameter end thereof establishing a focal point at which the scintillations is concentrated as a colored dot of light.

27. The apparatus as defined in claim 26 including shutter means mounted in operative relation to the conical members for selectively blocking entry of external light.

28. The apparatus as defined in claim 23 wherein the optical means includes a plurality of photon concentrating devices respectively coupling the radiation detecting elements to the viewing window, each of said photon concentrating devices including an internally reflective conical member having a large diameter end mounted on one of the radiation detecting elements and a small diameter end from which the scintillations emerge and a focusing lens mounted in the conical member adjacent said small diameter end thereof establishing a focal point at which the scintillations from one of the radiation detecting elements is concentrated.

29. The apparatus as defined in claim 28 including shutter means mounted in operative relation to the conical members for selectively blocking entry of external light through the viewing window.

* * * * *